United States Patent Office 2,947,724
Patented Aug. 2, 1960

2,947,724
NON-BLOOMING, NON-STAINING RUBBER ANTIOXIDANTS

Joseph C. Ambelang, Akron, Ohio, assignor to The Firestone Tire & Rubber Company, Akron, Ohio, a corporation of Ohio No Drawing. Filed Dec. 20, 1957, Ser. No. 703,994

17 Claims. (Cl. 260—45.95)

This invention relates to a novel class of rubber antioxidants and to the utilization of same for the protection of natural and synthetic rubber compositions.

In the latter respect the invention relates to vulcanized, as well as unvulcanized but vulcanizable, rubber compositions resistant to deterioration normally attending aging of the compositions, whether by the action of heat, light, oxygen or any combination thereof. The invention includes the production of the improved rubber compositions by incorporating the novel antioxidant into a rubbery composition prior to vulcanization thereof.

It has previously been proposed to utilize as rubber antioxidants the condensation products of mono- and di-substituted m-cresol, since these condensation products are substantially non-discoloring when utilized in light colored rubber compositions. While it is true that certain of these products have been a great improvement over the prior phenolic rubber antioxidants in the degree of protection afforded the rubber, they suffer a disadvantage when utilized in black or dark colored rubber goods. For example, in the conventional black tire tread composition it has been found that these derivatives of m-cresol, when used in the ordinary concentration of approximately 1% on the rubber, quickly bloom to the surface of the vulcanized rubber product causing it to assume an unsightly appearance. Such blooming is extremely objectionable from a commercial standpoint, since it renders the rubber products practically unsaleable.

It is an object of the present invention to produce a new class of non-staining rubber antioxidants, which are useful for the protection of rubber compositions from deterioration.

It is also an object to provide an improved class of non-staining antioxidants which do not tend to bloom from rubber compositions containing them while present therein to the extent desirable for full protection of the rubber composition.

A further object of the invention is to provide improved vulcanized, as well as unvulcanized but vulcanizable, rubber compositions resistant to deterioration, and to provide suitable methods for the production of such improved rubber compositions.

Other objects will be apparent in the description of the invention which follows.

The antioxidants of the invention belong to the class of 1,1-bis(3-polyalkylcarbinyl-2 and 4-hydroxy-6-isopropylphenyl) alkanes of the following formulas:

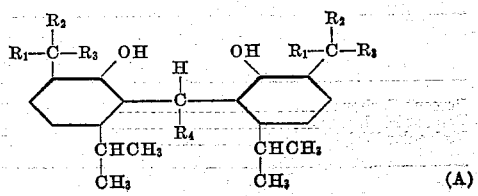

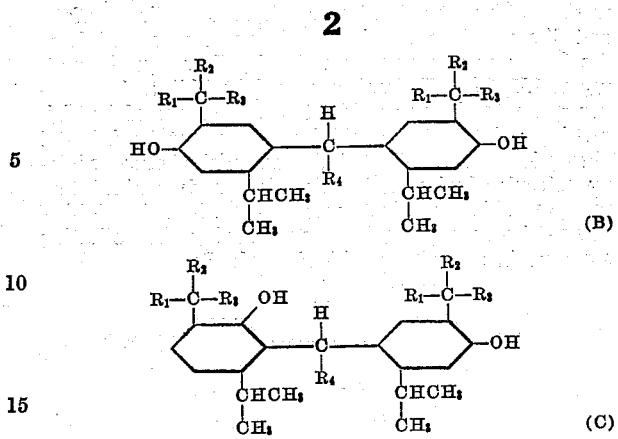

In each of Formulas A, B and C, $R_1$ and $R_4$ are hydrogen or alkyl radicals, and $R_2$ and $R_3$ are alkyl radicals. When $R_4$ is alkyl, it can contain one to eight, inclusive, carbon atoms. $R_1$, $R_2$ and $R_3$ contain a total of two through nine carbon atoms.

The new antioxidants can be prepared by reacting substantially one mole of an aliphatic aldehyde with 2 moles of the appropriate substituted m-isopropylphenol. The aldehydes which are used in preparing the new antioxidants are formaldehyde, acetaldehyde, crotonaldehyde, butyraldehyde, isobutyraldehyde, aldol, acrolein, propionaldehyde, valeraldehyde, isovaleraldehyde, 2-ethylbutyraldehyde, hexanal, heptanal, 2-ethylhexanal, 3,5,5-trimethylhexanal and similar low molecular weight aliphatic aldehydes. The condensation reaction is preferably accelerated by the use of an acid catalyst. It is important, however, to avoid using any substantial excess of the aldehyde over the proportion thereof set out above, in order to produce the non-resinous, relatively low molecular weight compounds of the invention and to avoid producing high molecular weight resinous condensates, as the latter are relatively poor antioxidants.

The following examples are illustrative of the preparation of the antioxidants of the invention.

EXAMPLE 1.—1,1-BIS(3-TERT-BUTYL-2 AND 4-HYDROXY-6-ISOPROPYLPHENYL)METHANE

A solution was prepared by dissolving 68 grams (0.50 mole) of m-isopropylphenol in 50 ml. of n-hexane, and 4 grams of stannic chloride was added as a catalyst. The solution containing the catalyst was stirred at 40–50° C. for 2.5 hours during the gradual addition of 50 grams (0.54 mole) of tert-butyl chloride. The mixture was refluxed for 2 hours and then allowed to stand over-night at room temperature. The liquid reaction mixture was washed with dilute hydrochloric acid, then with water, then with 2% sodium hydroxide solution, and finally dried over sodium sulfate. The dried solution was filtered, and the filtrate was chilled to cause the reaction product to crystallize. The collected crystalline product weighed 51 grams and melted at 49–50° C. The analytical results are as follows:

| | Calculated for $C^{13}H_{20}O$ | Found |
|---|---|---|
| Percent Carbon | 81.24 | 81.22 |
| Percent Hydrogen | 10.41 | 10.54 |
| Molecular Weight | 192 | 191 |

A mixture of 9.6 grams (0.05 mole) of 2-tert-butyl-5-isopropylphenol, produced as described above, 2.1 grams (0.025 mole) of formaldehyde as formalin, 20 ml. of glacial acetic acid and 3.4 ml. of concentrated hydrochloric acid was allowed to stand at room temperature for 24 hours. The resulting mixture was diluted with an equal volume of water, and extracted with a mixture of petroleum ether and ether. The ether extract was washed with water, dried over anhydrous sodium sulfate, and filtered. The reaction product was separated from the filtrate as a few grams each of yellow crystals melting at 153–157° C. (molecular weight 364) and an amber syrup (molecular weight 308). Because of its high melting point and the additional fact that its infrared absorption curve indicated the essential absence of intramolecular hydrogen bonding, it was determined that the crystalline product was 1,1-bis(3-tert-butyl-4-hydroxy-6-isopropylphenyl)methane, having the following structure in accordance with Formula B:

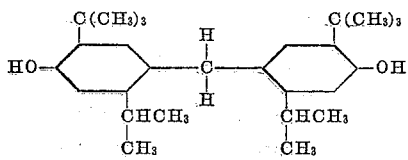

The infrared absorption curve for the syrupy product showed substantial intramolecular hydrogen bonding and also the substantial presence of disassociated hydroxyl groups when the product was measured in dilute solution. Hence the liquid reaction product contained a substantial proportion of 1,1-bis(2-hydroxy-3-tert-butyl-6-isopropylphenyl)methane, having the following structure in accordance with Formula A:

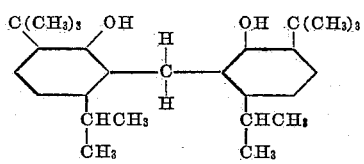

together with a substantial proportion of 1,1-bis(3-tert-butyl-4-hydroxy-6-isopropylphenyl)methane of Formula B and/or the substance in accordance with Formula C having the following structure:

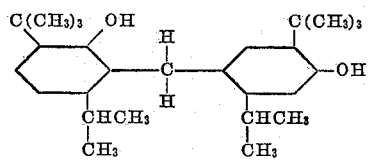

EXAMPLE 2.—1,1-BIS(3-TERT-BUTYL-2 AND 4-HYDROXY-6-ISOPROPYLPHENYL)N-BUTANE

A mixture of 9.6 grams (0.05 mole) of 2-tert-butyl-5-isopropylphenol, produced as described above, 1.8 grams (0.025 mole) of n-butyraldehyde, 20 ml. of glacial acetic acid and 3.4 ml. of concentrated hydrochloric acid was allowed to stand at room temperature for 24 hours. The resulting mixture was diluted with an equal volume of water, and extracted with a mixture of petroleum ether and ether. The ether extract was washed with water, dried over anhydrous magnesium sulfate, and filtered. The reaction product obtained from the filtrate was a thick red-brown syrup containing a few crystals, and containing a substantial proportion of 1,1-bis(3 - tert - butyl - 4 - hydroxy - 6 - isopropylphenyl)n - butane having the following formula in accordance with Formula B:

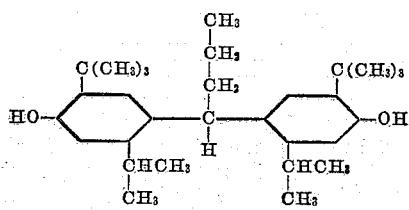

The product also contained 1,1-bis(2-hydroxy-3-tert-butyl-6-isopropylphenyl)n-butane, having the following structure in accordance with Formula A:

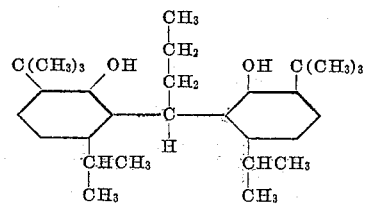

EXAMPLE 3.—1,1 - BIS(3-TERT-BUTYL-2 AND 4-HYDROXY-6-ISOPROPYLPHENYL)N-HEXANE

A mixture of 9.6 grams (0.05 mole) of 2-tert-butyl-5-isopropylphenol, produced as described in Example 1, 2.5 grams (0.025 mole) of n-hexaldehyde, 20 ml. of glacial acetic acid and 3.4 ml. of concentrated hydrochloric acid was allowed to stand 24 hours at room temperature. The resulting mixture was diluted with an equal volume of water, and extracted with a mixture of petroleum ether and ether. The ether extract was worked up as in previous examples to yield a few grams of very dark red syrup, containing a substantial proportion of 1,1 - bis(3 - tert - butyl - 4 - hydroxy - 6 - isopropylphenyl)n-hexane, having the following formula in accordance with Formula B:

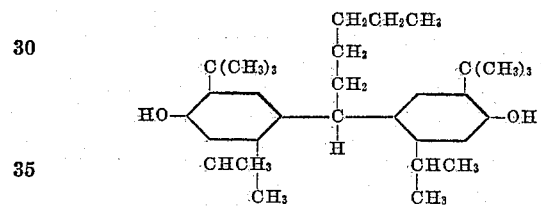

The product also contained 1,1-bis(2-hydroxy-3-tert-butyl-6-isopropylphenyl)n-hexane, having the following structure in accordance with Formula A:

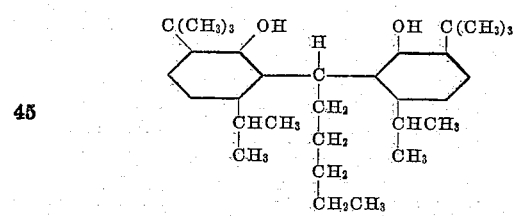

EXAMPLE 4.—1,1-BIS(3-TT-OCTYL-2 AND 4-HYDROXY-6-ISOPROPYLPHENYL)METHANE

Into a 500 ml. 3-necked flask provided with a stirrer, a dropping funnel and a thermometer were placed 68 grams (0.50 mole) of m-isopropylphenol and 5 grams of stannic chloride. To this mixture 84 grams (0.75 mole) of diisobutylene was slowly added with stirring. The temperature of the mixture slowly rose from 24° to 45° C. After addition of the diisobutylene the dropping funnel was replaced with a reflux condenser, and the reaction mixture was heated for 2 hours at 75° C. Then the mixture was cooled, washed with dilute hydrochloric acid, then water, 5% sodium hydroxide and finally water. The product was dried over anhydrous sodium sulfate. The crude product was vacuum-distilled to yield 69 grams of a colorless, viscous liquid boiling at 100–102° C. at 2 mm. The liquid product analyzed as follows:

| | Calculated for $C_{17}H_{25}O$ | Found |
|---|---|---|
| Percent Carbon | 82.3 | 82.1 |
| Percent Hydrogen | 11.2 | 11.3 |
| Molecular Weight | 248 | 245 |

A mixture of 12.3 grams (0.05 mole) of 2-tt-octyl-5-isopropylphenol, produced as described above, 2.5 grams (0.03 mole) of formaldehyde as formalin, 3.4 ml. of concentrated hydrochloric acid and 30 ml. of glacial acetic acid was allowed to stand at room temperature for 24 hours. The resulting mixture was diluted with an equal volume of water, and extracted with a mixture of petroleum ether and ether. The ether extract was washed with water, dried over anhydrous magnesium sulfate, and filtered. The reaction product obtained from the filtrate was a thick syrup, containing a substantial proportion of 1,1-bis(3-tt-octyl-4-hydroxy-6-isopropylphenyl)methane, having the following formula in accordance with Formula B:

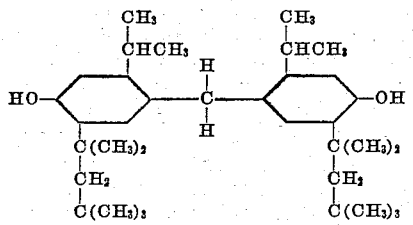

The product also contained 1,1-bis(2-hydroxy-3-tt-octyl-6-isopropylphenyl)methane, having the following structure in accordance with Formula A:

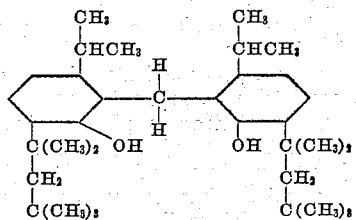

Test I

The antioxidants of the invention, prepared as indicated above, were tested in comparison with a conventional staining antioxidant in the following pneumatic tire tread formula:

Ingredients: Parts by weight
Rubber _____ 100
Softener _____ 4
Stearic acid _____ 3
Zinc oxide _____ 3
Thiazole accelerator _____ 1
Sulfur _____ 3
Carbon black (EPC) _____ 50
Antioxidant _____ 1

The control stock contained the conventional staining antioxidant, 6-phenyl-2,2,4-trimethyl-1,2-dihydroquinoline, and the antioxidants of the invention were included in the two other analogous stocks, as shown in Table 1, which also contains testing data on the three rubber compositions.

TABLE 1

| Antioxidant | Test Stock | | |
|---|---|---|---|
| | A | B | C |
| 6-phenyl-2,2,4-trimethyl-1,2-dihydroquinoline | A | | |
| 1,1-Bis(3-tert-butyl-4-hydroxy-6-isopropyl phenyl)methane | | B | |
| 1,1-Bis(3-tert-butyl-2 and 4-hydroxy-6-isopropylphenyl)n-butane | | | C |
| Cure 60 minutes at 280° F. | | | |
| Normal Tensile Properties: | | | |
| Modulus at 400% elongation (p.s.i.) | 2,750 | 2,725 | 2,750 |
| Tensile strength (p.s.i.) | 3,800 | 3,700 | 3,550 |
| Elongation at break (%) | 490 | 480 | 460 |
| Aged 2 Days at 212° F. in Air: | | | |
| Modulus at 400% | | | |
| Tensile strength | 1,800 | 2,000 | 1,775 |
| Elongation at break | 270 | 270 | 260 |
| Percent Retention of tensile strength | 47.5 | 54.0 | 50.0 |

It will be seen from Table 1 that the two antioxidants of the invention were superior in protecting tire tread rubber from deterioration in comparison with the well thought of dihydroquinoline antioxidant.

Test II

The two antioxidants of the invention utilized in Test I were compared in a typical black sidewall tire stock with analogous condensation products of butyl m-cresol. The black sidewall tire stock formula is the following:

Ingredients: Parts by weight
Rubber _____ 100
Carbon black (EPC) _____ 25
Zinc oxide _____ 3
Pine tar _____ 3
Sulfur _____ 2
Stearic acid _____ 2
Thiazole accelerator _____ 1.05
Antioxidant _____ 1

Comparisons of the control stock "D" containing no antioxidant with the stocks containing the antioxidants of the invention and stocks containing the m-cresol derivatives are given in the following Table 2.

TABLE 2

| | Test Stock | | | | |
|---|---|---|---|---|---|
| | D | E | F | G | H |
| Control (no antioxidant) | D | | | | |
| 1,1-bis(3-tert-butyl-4-hydroxy-6-isopropylphenyl)methane | | E | | | |
| 1,1-bis(3-tert-butyl-2 and 4-hydroxy-6-isopropylphenyl)n-butane | | | F | | |
| 2-tert-butyl-5-methylphenol-formaldehyde condensate | | | | G | |
| 2-tert-butyl-5-methylphenol-butyraldehyde condensate | | | | | H |
| Cure 60 minutes at 280° F.: | | | | | |
| Aged 7 days—bloom observed | none | none | none | crystalline bloom. | crystalline bloom. |
| Aged 31 days—bloom observed upon scraping surface | none | none | none | moderately heavy white. | moderately heavy white. |

Table 2 clearly shows that the antioxidants of the present invention do not bloom, whereas aldehyde-condensation products of m-cresol bloom badly.

Test III

An antioxidant of the present invention was compared with another derivative of m-cresol in a white sidewall tire stock of the following formula:

Ingredients: Parts by weight
Pale crepe rubber _____ 100
White pigments _____ 85
Ultramarine blue _____ 0.2
Zinc oxide _____ 5
Stearic acid _____ 1.2
Sulfur _____ 3
Accelerator _____ 0.9
Wax _____ 2
Antioxidant _____ 1

Stocks containing the two test antioxidants were mixed in the usual manner and cured 60 minutes at 280° F. with results all as shown in the following Table 3:

TABLE 3

| Antioxidant | Test Stock | |
|---|---|---|
| 1,1-bis(3-tert-butyl-4-hydroxy-6-isopropyl-phenyl)-methane. | J | |
| 2-tert-butyl-5-methylphenol-acetaldehyde condensate. | | K |
| Cure 60 minutes at 280° F. | | |
| Normal Tensile Properties: | | |
| Modulus at 400% | 950 | 875 |
| Tensile strength | 3,700 | 3,550 |
| Elongation at break | 640 | 630 |
| Aged 2 Days at 212° F. in Air: | | |
| Modulus at 400% | 1,075 | 1,000 |
| Tensile strength | 2,550 | 2,350 |
| Elongation at break | 540 | 530 |
| Percent Retention of tensile strength | 69 | 66 |

It is evident from Table 3 that the antioxidant of the invention is superior to the m-cresol derivative in imparting higher physical properties to a white sidewall tire stock and in retaining more strength after aging.

Other antioxidant tests in both white and black sidewall stocks have shown the following additional examples of the invention to be good non-discoloring, non-blooming antioxidants:

Example 1: Syrupy product comprising a substantial proportion of 1,1-bis(2-hydroxy-3-tert-butyl-6-isopropylphenyl)methane Example 3: 1,1-bis(3-tert-butyl-2 and 4-hydroxy-6-isopropylphenyl)n-hexane Example 4: 1,1-bis(3-tt-octyl-2 and 4-hydroxy-6-isopropylphenyl)methane In the tests described above the new antioxidants were mixed with dry rubber in the conventional manner, that is, on a rubber mill or in a Banbury or other internal mixer. The antioxidants are readily mixed with a natural or synthetic rubber latex by the known technique of introducing water insoluble liquids or solids into latex; an aqueous dispersion of the antioxidant is formed by any of several known methods, as by ball-milling a solid antioxidant with water and a dispersing agent, in the form of a slurry, until a stable colloidal dispersion is produced. The dispersion is simply mixed with the rubber latex. The resulting latex is used in any of the many ways in which rubber latex is utilized; by casting a film, gelling in the desired configuration, coagulating the rubber and using the latter as dry rubber, etc. This latex technique is especially useful in protecting synthetic rubbers, because some antioxidant or stabilizer is usually desirable in the latex before coagulation, in order to protect the rubber during drying.

The antioxidants of the invention are likewise effective as stabilizers or oxidation inhibitors for the various vulcanizable synthetic rubbers produced by polymerizing or copolymerizing a 1,3-butadiene (including hydrocarbon homologs of butadiene) alone or in the presence of a substituted ethylene monomer including styrene, alpha-methyl styrene (such as GR-S, produced during and after the war by and for the Government of the United States), acrylonitrile, methacrylonitrile, an ester of vinyl alcohol, an ester of acrylic or methacrylic acids, vinylpyridine, vinylcarbazole or other low molecular weight vinyl monomers. The antioxidants are of definite value in the synthetic rubber known as GR-A (which is the United States Government designation of a rubbery copolymer of acrylonitrile and 1,3-butadiene, containing at least 50% of combined butadiene).

Thus it is seen that the antioxidants of the invention are valuable non-discoloring, non-blooming antioxidants and stabilizers for natural as well as vulcanizable synthetic rubbers, protecting both the unvulcanized polymers as well as the vulcanized rubbery compositions from deterioration due to oxygen, heat, sunlight or other actinic light. Although the tests show the use of 1% of the antioxidant in the rubber, any relatively small proportion of the antioxidant can be employed, for example, 0.1 to 10% by weight of the rubber.

The vulcanized products of the invention can be obtained by vulcanizing with sulfur with or without an accelerator, vulcanizing without free sulfur but in the presence of any of the well-known sulfur donors, as well as cross-linking agents such as dithiols, nitro- and nitroso-compounds, as are well known in the rubber art for vulcanizing a rubber. Any rubber, natural or synthetic capable of being vulcanized by any of the foregoing vulcanizing agents is contemplated.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e.g., N-cyclohexyl-2-benzothiazolesulfenamide, thiazoline sulfenamides, thiocarbamyl sulfenamides, mercaptothiazoles, mercaptothiazolines, thiazoyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Vulcanization is usually accomplished by heating a vulcanizable rubber composition at a temperature in the range of 240 to 400° F. for a time ranging from several hours to a few seconds, although vulcanization of some fast-curing compositions does take place at lower temperatures, as is well known in the art.

This application is a continuation-in-part of application Serial No. 375,805, filed August 21, 1953, now abandoned.

What is claimed is:

1. A vulcanizable rubbery diolefin hydrocarbon polymer composition containing as an anti-oxidant 0.1 to 10 percent by weight of the rubber of a 1,1-bis(3-polyalkylcarbinyl-6-isopropyl-hydroxyphenyl)alkane of the group consisting of compounds of Formula A, Formula B and Formula C, in which $R_1$ and $R_2$ are methyl radicals, $R_3$ is of the group consisting of methyl and neopentyl radicals and $R_4$ is of the group consisting of hydrogen and alkyl radicals containing one to eight, inclusive, carbon atoms.

2. A vulcanizable rubbery diolefin hydrocarbon polymer composition containing as an antioxidant 0.1 to 10 percent by weight of the rubber of 1,1-bis(3-tert-butyl-2-hydroxy-6-isopropylphenyl)methane.

3. A sulfur vulcanizable rubbery diolefin hydrocarbon polymer composition containing as an antioxidant 0.1 to 10 percent by weight of the rubber of 1,1-bis(3-tert-butyl-4-hydroxy-6-isopropylphenyl)methane.

4. A vulcanizable rubbery diolefin hydrocarbon polymer composition containing as an antioxidant 0.1 to 10 percent by weight of the rubber of 1,1-bis(3-tert-butyl-4-hydroxy-6-isopropylphenyl)n-butane.

5. A vulcanizable rubbery diolefin hydrocarbon polymer composition containing as an antioxidant 0.1 to 10 percent by weight of the rubber of 1,1-bis(3-tert-butyl-4-hydroxy-6-isopropylphenyl)n-hexane.

6. A vulcanizable rubbery diolefin hydrocarbon polymer composition containing as an antioxidant 0.1 to 10 percent by weight of the rubber of bis(3-tt-octyl-4-hydroxy-6-isopropylphenyl)methane.

7. Method of protecting a vulcanizable rubbery diolefin hydrocarbon polymer from deterioration without appreciable discoloration or blooming, comprising mixing with a latex of the polymer 0.1 to 10 percent by weight of the rubber of a 1,1-bis(3-polyalkylcarbinyl-6-isoproyl-hydroxyphenyl)alkane of the group consisting of compounds of Formula A, Formula B and Formula C, in which $R_1$ and $R_2$ are methyl radicals, $R_3$ is of the group consisting of methyl and neopentyl radicals and $R_4$ is of the group consisting of hydrogen and alkyl radicals containing one to eight, inclusive, carbon atoms.

8. Method of protecting a vulcanizable rubbery diolefin hydrocarbon polymer from deterioration without appreciable discoloration or blooming, comprising mixing with a latex of the rubber 0.1 to 10 percent by weight of the rubber of 1,1-bis(3-tert-butyl-4-hydroxy-6-isopropylphenyl)methane as an antioxidant.

9. Method of making a rubber product resistant to deterioration comprising sulfur-vulcanizing a rubbery diolefin hydrocarbon polymer in the presence of 0.1 to 10 percent by weight of the rubber of a 1,1-bis(3-polyalkylcarbinyl-6-isopropyl-hydroxyphenyl)alkane of the group consisting of compounds of Formula A, Formula B and Formula C, in which $R_1$ and $R_2$ are methyl radicals, $R_3$ is of the group consisting of methyl and neopentyl radicals and $R_4$ is of the group consisting of hydrogen and alkyl radicals containing one to eight, inclusive, carbon atoms.

10. Method of making a rubber product resistant to deterioration comprising vulcanizing rubbery diolefin hydrocarbon polymer in the presence of 0.1 to 10 percent by weight of the rubber of 1,1-bis(3-tert-butyl-4-hydroxy-6-isopropylphenyl)methane as an antioxidant.

11. Method of making a rubber product resistant to deterioration comprising sulfur-vulcanizing a rubbery diolefin hydrocarbon polymer in the presence of 0.1 to 10 percent by weight of the rubber of bis(3-tert-butyl-2-hydroxy-6-isopropylphenyl)methane.

12. Method of making a rubber product resistant to deterioration comprising sulfur-vulcanizing a rubbery diolefin hydrocarbon polymer in the presence of 0.1 to 10 percent by weight of the rubber of bis(3-tt-octyl-4-hydroxy-6-isopropylphenyl)methane.

13. Vulcanized rubbery diolefin hydrocarbon polymer resistant to deterioration containing 0.1 to 10 percent by weight of the rubber of a 1,1-bis(3-polyalkylcarbinyl-6-isopropyl-hydroxyphenyl)alkane of the group consisting of compounds of Formula A, Formula B and Formula C, in which $R_1$ and $R_2$ are methyl radicals, $R_3$ is of the group consisting of methyl and neopentyl radicals and $R_4$ is of the group consisting of hydrogen and akyl radicals containing one to eight, inclusive, carbon atoms.

14. Vulcanized rubbery diolefin hydrocarbon polymer resistant to deterioration containing 0.1 to 10 percent by weight of the rubber of bis(3-tert-butyl-4-hydroxy-6-isopropylphenyl)methane.

15. Vulcanized rubbery diolefin hydrocarbon polymer resistant to deterioration containing 0.1 to 10 percent by weight of the rubber of 1,1-bis(3-tert-butyl-2-hydroxy-6-isopropylphenyl)n-butane.

16. Vulcanized rubbery diolefin hydrocarbon polymer resistant to deterioration containing 0.1 to 10 percent by weight of the rubber of 1,1-bis(3-tert-butyl-2-hydroxy-6-isopropylphenyl)n-hexane.

17. Vulcanized rubbery diolefin hydrocarbon polymer resistant to deterioration containing 0.1 to 10 percent by weight of the rubber of bis(3-tt-octyl-2-hydroxy-6-isopropylphenyl-methane.

References Cited in the file of this patent

UNITED STATES PATENTS

| | | |
|---|---|---|
| 2,731,442 | Forman | Jan. 17, 1956 |
| 2,816,945 | Beaver | Dec. 17, 1957 |
| 2,875,174 | Webb et al. | Feb. 24, 1959 |